May 30, 1961 J. D. BORROFF ET AL 2,985,919
METHOD OF PRODUCING RUBBER HEELS
Filed June 4, 1958 4 Sheets-Sheet 1
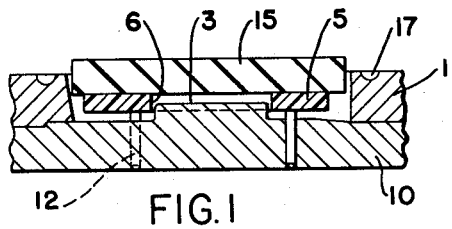
FIG.1
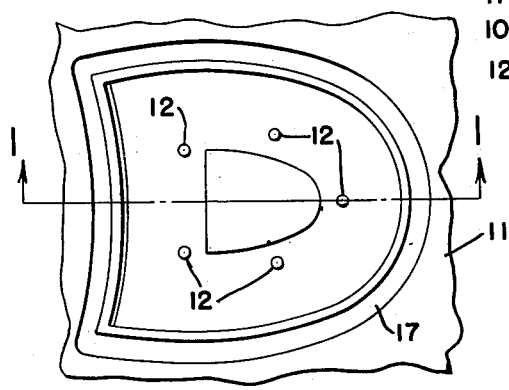
FIG.2
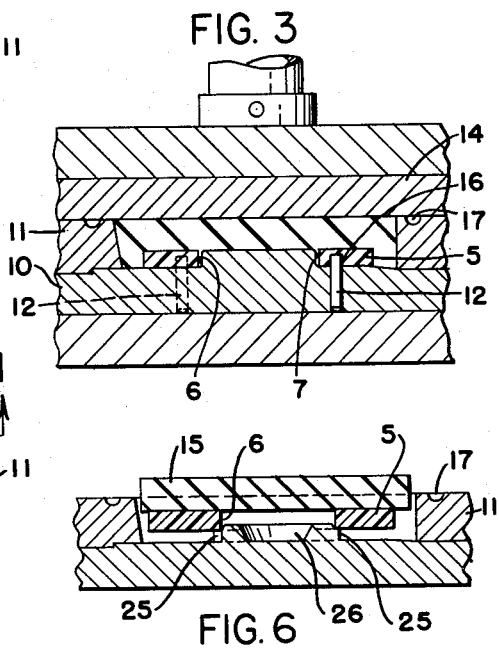
FIG. 3
FIG. 6
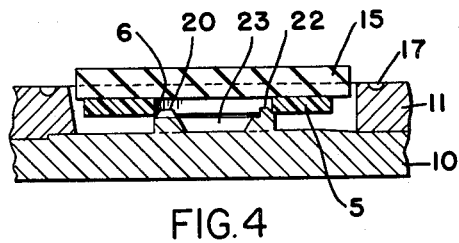
FIG.4
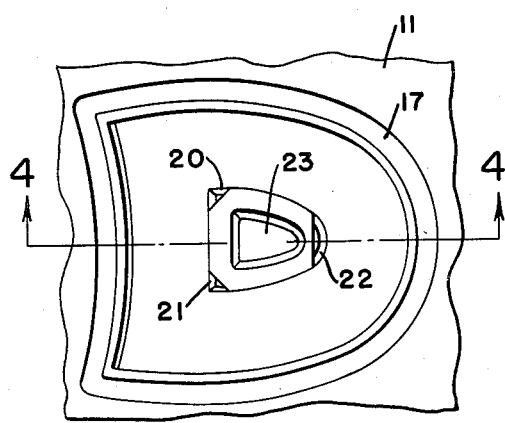
FIG.5
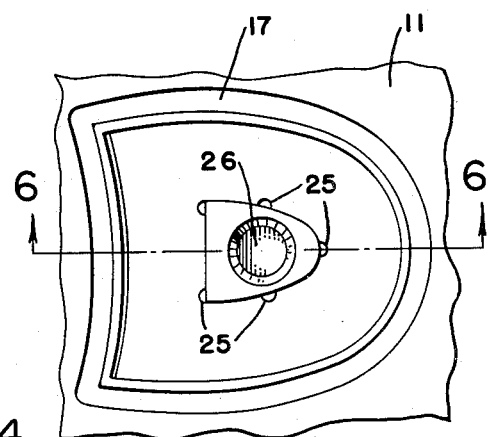
FIG.7
INVENTORS
JOHN D. BORROFF &
COY REYNOLDS
BY
ATTORNEY

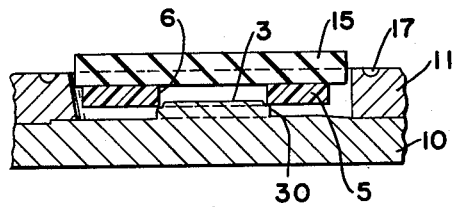
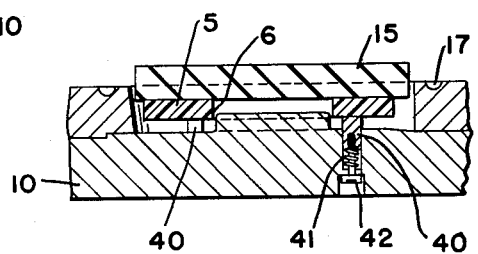
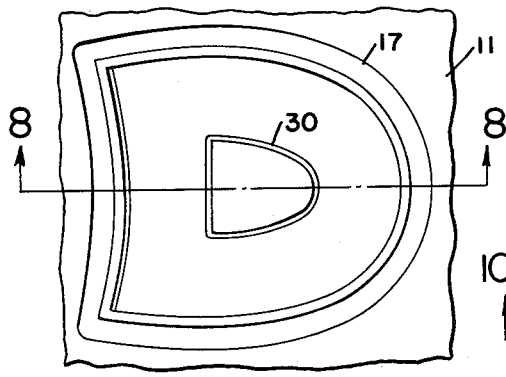
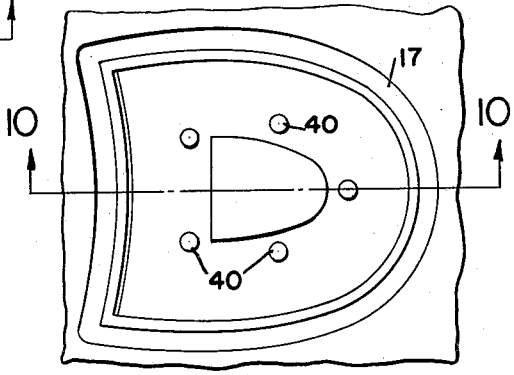
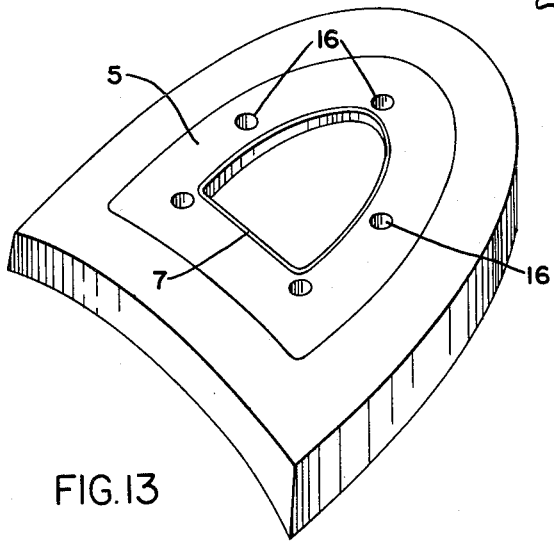
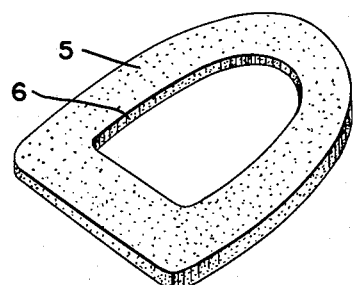

May 30, 1961  J. D. BORROFF ET AL  2,985,919
METHOD OF PRODUCING RUBBER HEELS
Filed June 4, 1958  4 Sheets-Sheet 4

INVENTORS
JOHN D. BORROFF &
COY REYNOLDS
BY
ATTORNEY

2,985,919
METHOD OF PRODUCING RUBBER HEELS

John D. Borroff, Wadsworth, and Coy Reynolds, Carey, Ohio, assignors to Seiberling Rubber Company, Barberton, Ohio, a corporation of Delaware Filed June 4, 1958, Ser. No. 739,921

6 Claims. (Cl. 18—59)

This invention relates to the production of rubber heels. It relates more particularly to the method of incorporating nailable plastic cores in the heels.

DEFINITIONS

The word "shoe" is used herein to refer generally to shoes, boots, slippers, etc.

The word "rubber" is used herein to include both natural rubber and rubber which is produced synthetically, and also mixture thereof.

The terms "flowably soften," "flowably softenable," etc. will be used herein to refer to a plastic heel-core composition; one which softens at or below the temperature of the mold during the curing of the heel and flows either when not subjected to pressure or when subjected to the pressure to which it is subjected in the heel mold prior to vulcanization of the rubber of the heel. The core composition may be thermosettable and capable of being cured (or set) by heating. Alternatively, it may be thermoplastic.

THE PRIOR PRACTICE

The first practical rubber heels had metal washers incorporated in them, and the nails used to hold the heels to a shoe were driven through these washers. The washers prevented the heels from being torn away from the nails. The chief objection to the use of washers was that it necessitated locating the nails quite exactly when fastening the heel to shoes.

To overcome the necessity of using washers, nailable cores have been employed. Wood has been used, but there are objections to its use. For example, it is apt to warp during the curing of the rubber of the heel, also subsequently if the heel becomes so worn that the core is exposed to the weather. For another thing, if there is any moisture in the wood, it is converted to steam when the rubber is cured, and the pressure developed may be sufficient to break the bond within the wood.

Nailable plastic cores are considered very desirable, but no practical method of incorporating them in a heel has heretofore been developed. Such cores are advantageously located away from the outer edges of the heel and at least away from the convex edge so that when the shoe repairman shapes the heel to conform it to the shape of the shoe he does not cut into the core and expose it to view. This is particularly objectionable if the core is not the same color as the rubber.

THE PRESENT PRACTICE

Rubber heels are usually cured in multiple-cavity molds. For example, each mold may contain 60 cavities. The difficulty with employing plastic cores in the manner previously utilized is that normally it takes several minutes for the operator to prepare all of the cavities in a single mold for the molding operation. He first places a core in each of the cavities, and then places the rubber, usually in the form of a so-called biscuit, on top of the core. The upper plate of the mold is then lowered on to the bottom half of the mold, the mold is placed in a press, the press is closed mechanically or hydraulically, and the resulting pressure presses the rubber around the core in each cavity and shapes the heels. The heels are then cured under pressure at an elevated temperature, usually between 300 and 340° F. The molds are not cooled to room temperature between molding operations, but are emptied and reloaded while still hot. For instance, they may be 250° F. to 340° F. when reused.

During the several minutes that it takes to place the cores and rubber in the many cavities, whether or not the foregoing cycle is followed precisely, the cores which are first put in their respective cavities soften or even melt down somewhat before the charging of all of the cavities has been completed. When the rubber on top of a softened core is pressed down, the core spreads out over the bottom of the cavity, even to the outside edge. The rubber then fills the mold above the flattened core rather than being pressed down around the core's outside edge. This is objectionable because after curing there is no border of rubber around the core, and the shoe repairman has great difficulty in trimming the heel.

THE INVENTION

This invention overcomes such difficulties which result from the use of nailable, nail-retaining, flowably softenable cores by holding the cores out of contact with the surface of the mold cavity until the heel molds are closed for curing the heels. No washers are incorporated in the heels. The molds which are used may be molds of the usual design, or the molds may be especially designed for the purpose. (By "surfaces of the mold cavity" we refer to the top, bottom and side wall of the cavity and not pins, bosses, etc. by which a core is held out of contact with a large surface of the mold cavity until the mold is closed.)

The object in keeping the core out of contact with the surfaces of the mold cavity is to prevent the core from becoming so soft that it melts and flows to the outer edge of the cavity where it is not wanted. As the mold is closed, the rubber and cores, which latter have been out of contact with the surfaces of the mold cavity, are pressed simultaneously into the mold cavities and forced against the cavity surfaces. In this way the core is not flowably softened to an objectionable extent by the heat of the mold before the mold is closed. As the mold is closed, the rubber is pressed over the edges of the core and this holds the core in place even though it subsequently softens or even melts during the curing operation.

This method of operation has particular value with a multiple-cavity mold, but is not limited thereto. Single cavity molds, e.g., a series of such which are filled, closed, cured, and then emptied in rotation, may advantageously be operated in the manner here described, i.e., by supporting the core out of contact with the surfaces of the mold cavity until the rubber has been put in and the mold is closed.

There are many ways in which the core can be supported out of contact with the hot surfaces of the mold cavity until all of the cavities have been properly charged with cores and rubber. A few of these are illustrated in the accompanying drawings.

There is nothing new in the composition of the rubber employed in the heels, and plastic cores of widely different compositions may be utilized. The cores are made of a plastic stock to which the rubber of the heel adheres, preferably without the use of any adhesive.

The following represents a suitable vulcanizable core composition.

Core composition

|  | Parts by weight |
|---|---|
| SBR | 25 |
| Copolymer | 75 |
| Precipitated calcium carbonate | 40 |
| Zinc oxide | 5 |
| Stearic acid | 1 |
| Mercaptobenzothiazole | 1.5 |
| Tetramethylthiuram monosulfide | 0.15 |
| Sulfur | 2 |
|  | 149.6 |

The copolymer is prepared from 85 parts of styrene and 15 parts of butadiene. SBR is a synthetic rubber prepared from substantially 75 parts of butadiene and 25 parts of styrene.

This composition is milled and calendered to a desired thickness and then the cores are cut from it. Before curing, cores of this composition are not objectionably softened at temperatures up to 140° F., but flowably soften at higher temperatures. They are cured or vulcanized by heating 10 minutes at 324° F. or longer, and will be vulcanized during the vulcanization of the rubber in which they are embedded. The Shore A hardness of the cores drops from 100 or over at 70° F. to about 50 at 212° F. The impact strength (Izod notched bar) of this cured stock is higher than ten pounds per inch. The cured cores are soft and flexible at curing temperatures, but will not be permanently distorted when subjected to the treatments involved in carrying out this invention.

The core may contain fibrous or other filler. Any one of many compositions may be employed.

Many rubber compositions which have been used for heel stock are suitable for the manufacture of the heel of this invention. The following is representative.

Rubber composition

|  | Parts by weight |
|---|---|
| Smoked sheet rubber | 75 |
| Brown mechanical reclaim rubber | 50 |
| Calcium silicate | 37.5 |
| Hard clay | 50 |
| Zinc oxide | 5 |
| Stearic acid | 2 |
| Plasticizing oil | 5 |
| Mercaptobenzothiazole | 1.5 |
| Sulfur | 3.5 |

Heels from this stock are preferably cured at 324° F. for 12 minutes. The core and rubber are bonded to one another during the curing operation.

It is to be understood that stocks are compounded for curing at different temperatures, etc., and this invention is not limited to the employment of any particular stock or curing conditions.

The invention will be illustrated with reference to the accompanying drawings, but it is to be understood that it is not limited thereto. In the drawings, the plate which forms the walking surface of the heel, which surface is usually engraved to emboss the trademark or name of the manufacturer on the heel, is referred to herein as the face plate. The opposite plate is called the back plate. The plate in between these which forms the wall of the molding cavity is the middle plate. In the drawings—

Fig. 1 is a section on the line 1—1 of Fig. 2, through an open mold cavity with a core supported off the bottom of the cavity, which in this instance is the back plate; and a biscuit of rubber is shown resting on the core;

Fig. 2 is a plan view of the empty mold cavity;

Fig. 3 is a section through the cavity of the mold in a press, with the rubber filling the mold cavity around the core, and with the face plate in position and the press closed as it is during the vulcanization of a heel;

Fig. 4 is a section on the line 4—4 of Fig. 5 showing a somewhat different type of boss and means for supporting the core on the boss, with the core and rubber in place before closing the mold;

Fig. 5 is a plan view of the empty mold cavity;

Fig. 6 is a section on the line 6—6 of Fig. 7 showing a still different type of boss and different means for supporting the core on the boss, with the core and rubber in place before closing the mold;

Fig. 7 is a plan view of the empty mold cavity;

Fig. 8 is a section on the line 8—8 of Fig. 9 showing different means for supporting the core on the boss, with the core and rubber in place before closing the mold;

Fig. 9 is a plan view of the empty mold cavity;

Fig. 10 is a section on the line 10—10 of Fig. 11, showing still different means for supporting the core on the boss, with the core and rubber in place before closing the mold;

Fig. 11 is a plan view of the empty mold cavity;

Fig. 12 is a perspective view of the core;

Fig. 13 is a perspective view of the heel, with the bottom up;

Fig. 20 is a section through the bottom of a mold, before curing, showing a core separated from the back plate by a piece of paper or the like;

Fig. 26 is a section through the bottom of a mold having no boss in it, with the core separated from the back plate by a piece of paper or the like;

Figure 14:
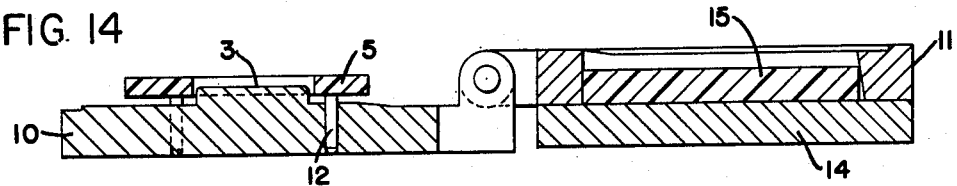
Fig. 14 is a section through a hinged mold with the core supported on pins and the rubber biscuit stuffed in the cover of the mold prior to closing.

Figures 1–11, 16 and 18–27 show one cavity of a multiple-cavity mold. In all of these but Figs. 18, 19, 26 and 27 there is a boss 3 which thins out the central portion of the heel so as to produce a void between the heel and the bottom of the shoe. Various means are shown for supporting the cores 5 in the different molds. In some of the arrangements shown, the opening in the core is so small that the core is supported by the boss. Different types of bosses are shown and the different means for supporting the core are interchangeable with the different types of bosses. It is not necessary that the mold include a boss in the central area, because both surfaces of the heel may be relatively flat. It is generally desirable to provide a boss or some means for centering the core to prevent its shifting during molding. Although the means for supporting the cores are shown as being supported by the back plate 10, they may be supported from the middle plate 11, or in any suitable manner.

If the opening 6 in the core 5 is somewhat larger than the area of the boss, and the core is properly placed in the mold cavity, a thin skin 7 of rubber will cover the inner surface of the core during molding. However, it is immaterial whether this inner surface of the core be covered with rubber or not, and in actual production a skin may be formed over the core on one side of the opening and not on the other side.

Referring now to Fig. 1, there is nothing unusual about the mold design except for the means for supporting the core 5. The surface of the back plate 10 is of the usual shape, and the walls of the cavity are defined by the middle plate 11 of the mold. The use of pins 12 for the purpose described is novel. If the core is supported only on pins, there must be at least three pins to support it. One or more pins may be used with other means of support. The drawings illustrate a mold in which there are five pins 12. The rubber biscuit 15 is placed on the core. When the face plate 14 of the mold is lowered into place and the press is closed, this face plate presses down on the biscuit. This forces each core over the pins in each cavity with the pins forming depressions in the cores, as illustrated at 16 in Fig. 13. The excess rubber overflows into the overflow grooves 17. Fig. 13 shows a finished heel with the core 5 embedded in it.

In Figs. 4 and 5 the corners 20 and 21, of the boss, toward the breast of the heel are raised with tapered lugs that slant inwardly toward the center of the boss. There is also a tapered lug 22 at the rear of the boss. The opening in the core 5 is slightly smaller than the boss so that the core rests on these supports. The central portion of the boss has been hollowed out at 23 to cause a more uniform flow of the rubber biscuit when the mold is closed. The heated boss may soften the core somewhat at the places where it contacts the core, but considerable pressure is required to force the core down into the mold around the boss.

The construction in Figs. 6 and 7 is somewhat similar, except that the core is supported by projections 25 around the boss, and the shape of the cavity 26 within the boss is different. Whereas in Figs. 4 and 5 the opening in the core is smaller than the area of the boss, in Figs. 6 and 7 it is larger than the boss so that the core is supported solely by the projections 25.

In Figs. 8 and 9 there is a recessed ledge 30 around the boss on which the core is supported. The opening in the core is such that the core rests on the cut-back portion of the ledge.

The mold of Figs. 10 and 11 resembles somewhat the mold shown in Figs. 1–3 except that the pins 40 are supported by springs 41 which surround the bolts 42, so that when pressure is applied, the pins are pushed down preferably so that their tops are level with the surface of the mold cavity.

Figure 15:
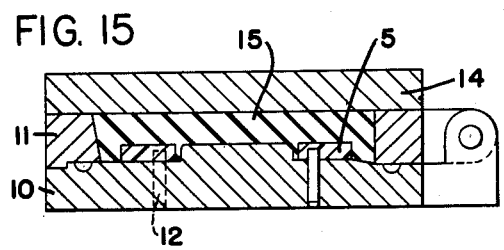
Fig. 15 is a section through the same with the cover closed.

The mold of Figs. 14 and 15 is a hinged mold. The middle plate 11 is bolted or otherwise fastened to the face plate 14. When the mold is open, as in Fig. 14, the rubber 15 can readily be stuffed into the cavity against the face plate 14. The core 5 is supported on pins 12 which are located around the boss 3. In closing this mold the plates 11 and 14 are swung over onto the back plate 10, as shown in Fig. 15. In closing the mold, the rubber 15 presses the core 5 around the pins and against the back plate 10. The mold is then put in a press where the heel is cured.

The hinged mold may be designed so that the back plate is swung over the face plate. The mold is then placed in the press with the face plate below the back plate. Alternatively, this mold may be put in the press with the plates perpendicular.

Although Figs. 14 and 15 illustrate more particularly a single cavity mold, a hinged mold may contain any number of cavities. The rubber biscuit can easily be stuffed in the cavity of the mold when it is opened. The biscuit may be placed on the core, if preferred, but there may be difficulties in having it accurately positioned so that the cavity will enclose it when the mold is closed.

Figure 17:
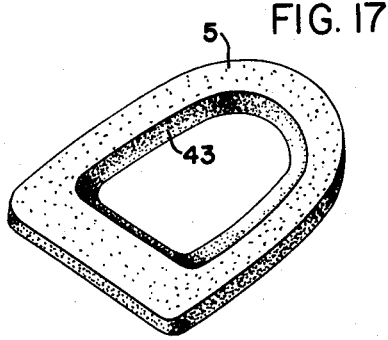
Fig. 17 is a perspective view of the new core.
Figure 16:
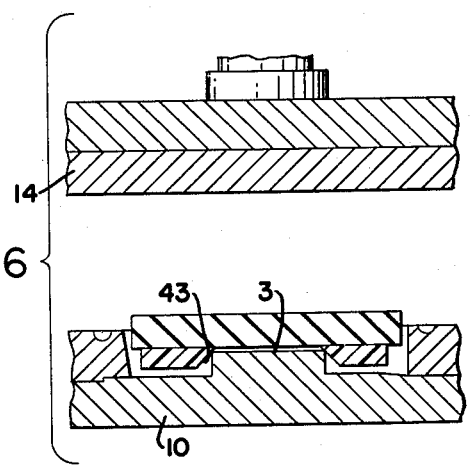
Fig. 16 is a section through a mold, before closing, with a core with a beveled center resting on a boss in the mold, and the rubber biscuit supported on this.

Fig. 16 illustrates how the invention may be adapted to the type of mold now in use. The back plate 10 is provided with a boss 3. The boss is not especially fabricated to support the core (as are the bosses of Figs. 4 to 10), but the core is especially fabricated to be lightly supported by the boss. The wall of the opening in the core is not sheer, as is customary, but is beveled at 43. (See Fig. 17.) This core is easily fabricated, some extra labor is required to position it in the mold, because it has a top and bottom. The beveled edge 43 rests on the boss. The biscuit is placed on top of it, and although the boss heats the core and may even cause it to melt slightly, the core composition does not flow to the outer wall of the molding cavity when the mold is closed. On the contrary, the rubber surrounds it and holds it in place. The core is supported near the top of its beveled edge 43. The heat of the boss softens this so that when the mold is closed, the inner edge of the core is drawn down around the boss by the balance of the core, with substantially no core remaining behind on the top of the boss.

Instead of beveling the inner wall of the core, this wall might be sheer except for a thin overhanging flange that would rest on the top of the boss and support the core off the bottom of the cavity until the mold is closed. This flange need not extend uninterruptedly around the hole in the core, because spaced overhanging portions are all that would be required to temporarily support the core. Even though the temporary support softened sufficiently to allow the core to settle somewhat around the boss, this would do no harm provided the core did not melt and flow to the outer edge of the molding cavity.

Figure 18:
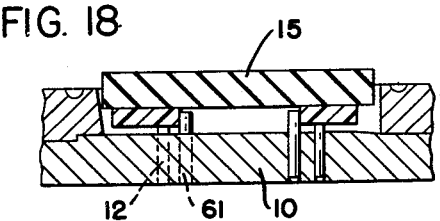
Fig. 18 is a section through the back plate and middle plate of a mold, there being no boss; with pins extending upwardly from the back plate to support the core, and other pins to aid in positioning the core, with a core and the rubber biscuit in place.
Figure 19:
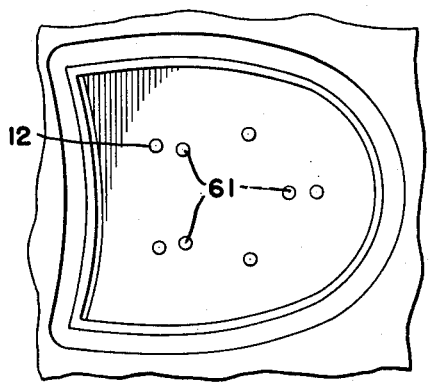
Fig. 19 is a plan view of the empty molding cavity.

The mold of Figs. 18 and 19 is not provided with a boss, but there are two sets of pins in it which extend upwardly from the back plate 10. The shorter pins 12 support the core off of the bottom of the mold. The taller pins 61 center the core away from the wall of the molding cavity, and of course assist the operator in locating the core on the shorter pins. The rubber biscuit rests on the core (or the taller pins if their tops are above the top of the core), and when the mold is closed, the rubber is pressed into the mold around the outer edge of the core.

Figures 20–27 show the core held out of contact with the surfaces of the mold cavity by other means. The means that holds the core out of contact with the mold may also insulate it from the heat of the back plate.

Figure 20:
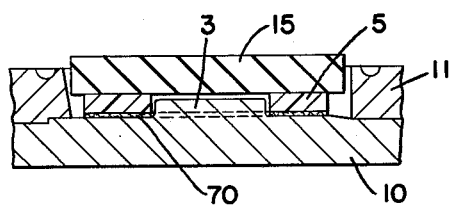
Figure 21:
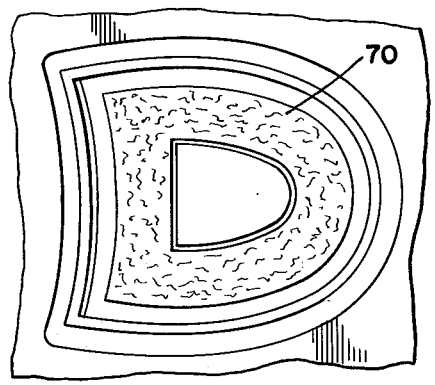
Fig. 21 is a plan view of the same with only the paper in the mold.

The back plate 10 of the mold of Fig. 20 is provided with a boss 3. The core 5 is separated from the back plate by a thin sheet of material 70 such as paper, cloth or the like. If cloth, it may be open mesh or closely woven. It supports the core out of contact with the surfaces of the mold cavity so that it is not heated objectionably before the rubber 15 is put in the mold, the mold is closed and the rubber is pressed around the core to prevent its outward flow. The core may soften and flow some, but not so much as to be objectionable.

The material 70 may be a thin sheet of therplastic composition or a rubber which may be of the same composition as the face stock, or a different composition. It will be advantageous if, at the time the mold is closed the sheet 70 is softer than the core so that as the mold is closed it flows easily to the sides of the core and there joins the material 15, filling the space between the outside edge of the core and the mold wall before maximum pressure is exerted on the core, thereby reducing objectionable flow of the core composition. The sheet 70 may be wider than the core. It may cover the whole of the bottom of the mold cavity, or it may be narrower than the core. It need not be the shape of the core, but may be square, circular, etc. It may be in more than one part. Such a sheet 70 may be of any shape. It need not be flat.

The fabric may become a part of the finished heel, but this is not necessary. If holland or the like is used, it may be stripped from the finished heel. In this case it advantageously covers the whole of the bottom of the mold.

Figure 23:
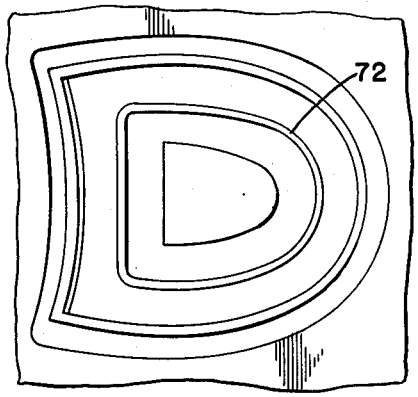
Fig. 23 is a plan view of the same with only the cord in the mold.
Figure 22:
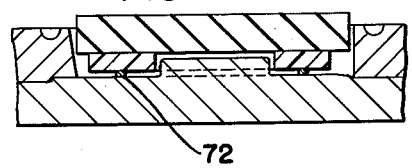
Fig. 22 is a section through the bottom of a mold, before curing, showing a core separated from the back plate by a cord.

Figures 22 and 23 illustrate the use of a wire, cord or the like 72, to hold the core up off of the back plate. It may be a string or rope. It may be formed of either heat-conducting or non-heat-conducting fibers. They may or may not soften when heated. If of metal or other heat-conducting material it makes contact with the core through only a small area of its surface so as not to conduct sufficient heat to the core to cause it to flow objectionably. It may be a crinkled wire which contacts the core at only spaced areas. Several cords, strings, wires, ropes or the like may be used. The support may be made of wood. When the mold is closed it becomes embedded in the heel. It is either embedded in the core, or as the rubber is pressed down around and under the core it is embedded in the rubber. It may be embedded partly in the core and partly in the rubber.

Figure 24:
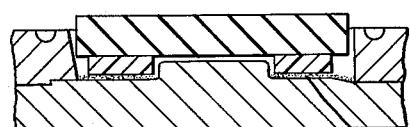
Fig. 24 is a section through the bottom of a mold, before curing, showing a core separated from the back plate by a sub-divided material.
Figure 25:
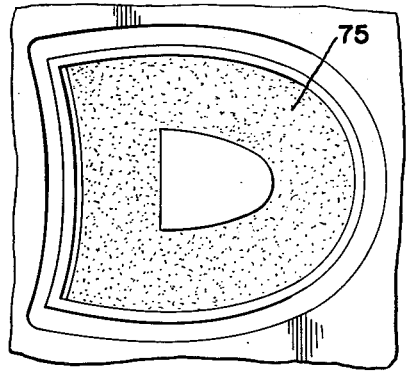
Fig. 25 is a plan view of the same with only the sub-divided material in the mold.

The core may be lifted out of contact with the mold by a sub-divided material 75 such as sand, talc, rubber crumb (vulcanized or unvulcanized), etc. as shown in Fig. 24. If a material such as talc is employed, it will not form a part of the finished heel. Some will adhere to the heel, but the remainder may be left in the mold and reused in subsequent curing operations.

Figure 26:
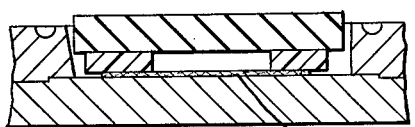
Figure 27:
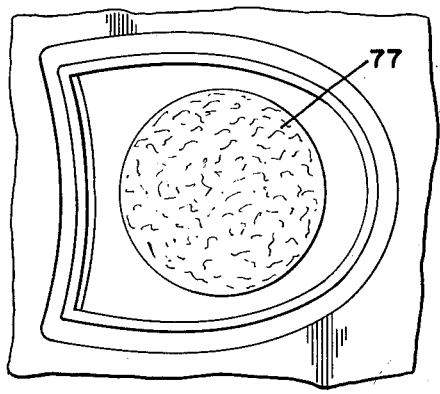
Fig. 27 is a plan view of the same with only the paper in the mold.

The mold of Figs. 26 and 27 includes no boss. The core may be the same shape as though there were a boss, or it may be annular, etc. Usually it will have an opening through its center, although this is not essential. It may be supported out of contact with the back plate in any suitable way. Figures 26 and 27 show a circular piece of fabric 77 as the support. A core of any shape may be supported on it.

Modifications can be made in the mold structure and the composition of the core and heel without departing from the scope of the claims which follow.

This application is a continuation-in-part of our application Serial No. 638,313, filed February 5, 1957.

What we claim is:

1. The method of molding and curing in a hot mold cavity with a back plate, a heel which comprises a vulcanizable rubber composition and a nailable, nail-retaining, flowably softenable plastic core smaller in area than the area of the back plate of the mold cavity but sufficiently large to receive a plurality of nails that can be driven through it at random in attaching the heel to a shoe, which method comprises supporting the core temporarily on supporting means with the core out of contact with the surfaces of the mold cavity and in a position which is at least close to the position it will occupy in the cavity on completion of the molding operation and filling the cavity with the vulcanizable rubber composition and heating the rubber composition and at least partially curing it and molding it therein and bonding the core and the rubber composition, with movement of the core to a position adjacent the surface of the back plate.

2. The method of claim 1 in which the supporting means is heat-insulating means which insulates the core from the heat of the mold.

3. The method of claim 1 in which between the core and a surface of the mold there is located thin heat-insulating means which separates the core from said mold surface and the core is in substantially the position it occupies in the finished heel.

4. The method of molding and curing a heel in a mold with a back plate, the heel comprising a vulcanizable rubber composition and a nailable, nail-retaining, flowably softenable plastic core smaller in area than the area of the back plate of the mold cavity but sufficiently large to receive a plurality of nails that can be driven through it at random in attaching the heel to a shoe, which method comprises placing the core adjacent the back plate while the mold is still hot from the previous molding operation, and in so placing the core adjacent the back plate supporting the core on metal supporting means with the contact between said supporting means and the core being so limited in area and so distributed as to prevent objectionable softening of the core due to conduction of heat from the supporting means thereto and filling the cavity with the vulcanizable rubber composition and heating the rubber composition and at least partially curing it and molding it therein.

5. The method of molding and curing in a hot multiple cavity mold with a back plate, a heel which comprises a vulcanizable rubber composition and a nailable, nail-retaining, flowably softenable plastic core smaller in area than the area of the back plate of the mold cavity but sufficiently large to receive a plurality of nails that can be driven through it at random in attaching the heel to a shoe, there being pins projecting from the back plate into the mold cavity, which method comprises temporarily supporting the core on said pins out of contact with the surfaces of the mold cavity in a position which is close to the position the core will occupy in the mold cavity on completion of the molding operation, and by pressure of the rubber composition on the core moving the core to a position adjacent the back plate with deformation of the core caused by its contact with the pins and filling the cavity around the core with the vulcanizable rubber composition, and then heating and at least partially curing the rubber composition and the core and molding the heel in the cavity and bonding the core to the rubber composition.

6. The method of claim 1 in which the supporting means is a boss located in the mold cavity and the core has an opening therethrough and the core adjacent said opening is supported by the boss.

References Cited in the file of this patent

UNITED STATES PATENTS

| | | |
|---|---|---|
| 1,354,734 | Furguson | Oct. 5, 1920 |
| 1,682,691 | Temple | Aug. 28, 1928 |
| 1,727,412 | Roberts | Sept. 10, 1929 |
| 1,746,282 | Roberts | Feb. 11, 1930 |
| 1,854,388 | Wolfe | Apr. 19, 1932 |
| 1,867,132 | Berenstein | July 12, 1932 |
| 1,877,298 | Goodwin | Sept. 13, 1932 |
| 2,027,651 | Penardi | Jan. 14, 1936 |
| 2,133,788 | Oakley | Oct. 8, 1938 |
| 2,446,404 | Basescu | Aug. 3, 1948 |
| 2,602,190 | Hein et al. | July 8, 1952 |
| 2,747,230 | Magnus | May 29, 1956 |